(12) United States Patent
Wu

(10) Patent No.: US 7,310,054 B2
(45) Date of Patent: Dec. 18, 2007

(54) COMPUTER KEYBOARD ASSEMBLY HAVING SEPARABLE TOP AND BOTTOM MODULES

(75) Inventor: Lee-Hong Wu, Lake Forest, CA (US)

(73) Assignee: Min-Yen Yu, Taipei (TW)

( * ) Notice: Subject to any disclaimer, the term of this patent is extended or adjusted under 35 U.S.C. 154(b) by 254 days.

(21) Appl. No.: 11/271,530

(22) Filed: Nov. 10, 2005

(65) Prior Publication Data

US 2007/0164879 A1    Jul. 19, 2007

(51) Int. Cl.
*H03M 11/00* (2006.01)
(52) U.S. Cl. .......................... 341/26; 345/168; 708/131
(58) Field of Classification Search ................ 341/20, 341/22, 26; 705/131; 345/168
See application file for complete search history.

(56) References Cited

U.S. PATENT DOCUMENTS 5,856,795 A * 1/1999 Arnold et al. ................ 341/26

2004/0000048 A1 * 1/2004 Wu ............................ 29/622

* cited by examiner

*Primary Examiner*—Albert K. Wong
(74) *Attorney, Agent, or Firm*—Frommer Lawrence & Haug LLP; Ronald R. Santucci

(57) ABSTRACT

A computer keyboard assembly includes a bottom module connected separably to a top module. The bottom module has a top wall formed with through holes registered respectively with key caps mounted movably on the top module, a wiring board provided with electrical contacts, an actuating unit disposed on the wiring board and having upright biasing members, each extending upwardly through a corresponding through hole and having an actuator contacting electrically a corresponding electrical contact as a result of movement of a corresponding key cap from a normal position to a depressed position, and a keyboard controller for interpreting a mode identification signal from a mode-determining unit of the top module so as to output an identification code corresponding to the mode identification signal.

8 Claims, 6 Drawing Sheets

COMPUTER KEYBOARD ASSEMBLY HAVING SEPARABLE TOP AND BOTTOM MODULES

BACKGROUND OF THE INVENTION

1. Field of the Invention

The invention relates to a computer keyboard, more particularly to a computer keyboard assembly having separable top and bottom modules.

2. Description of the Related Art

A computer keyboard assembly having separable top and bottom module assemblies has been disclosed in U.S. Patent Application Publication No. 2004/0000048A1. In the aforesaid computer keyboard assembly, the top module assembly is configured to include a plurality of key sets that are mounted respectively and fittingly on the bottom module assembly. However, the bottom module assembly cannot match another top module assembly provided with a game control device, such as a joystick device, for use in a game input mode.

SUMMARY OF THE INVENTION

Therefore, the object of the present invention is to provide a computer keyboard assembly that can eliminate the drawback of the aforesaid computer keyboard assembly.

According to the present invention, there is provided a computer keyboard assembly that is adapted to be coupled to a computer device installed with an interpreting program, and that comprises:

a top module including
  a frame body,
  a plurality of key caps mounted movably on the frame body such that each of the key caps is operable so as to move between a normal position and a depressed position, and
  a mode-determining unit for providing a mode identification signal corresponding to a desired keyboard input mode; and
a bottom module including
  a hollow housing disposed under and connected separably to the frame body of the top module, and having a top wall formed with a plurality of through holes, each of which is registered with a corresponding one of the key caps of the top module,
  a wiring board mounted in the housing and provided with a plurality of electrical contacts thereon, each of which is registered with a corresponding one of the through holes in the top wall of the housing,
  an actuating unit disposed on the wiring board and having a plurality of upright biasing members, each of which extends upwardly through a corresponding one of the through holes in the top wall of the housing, has an actuator registered with a corresponding one of the electrical contacts on the wiringboard, and contacts electrically the corresponding one of the electrical contacts as a result of movement of the corresponding one of the key caps from the normal position to the depressed position such that the wiring board generates a key signal, and
  a keyboard controller connected electrically to the wiring board and the mode-determining unit, and receiving and interpreting the key signal from the wiring board and the mode identification signal from the mode-determining unit so as to output a scan code corresponding to the key signal, and an identification code corresponding to the mode identification signal to the computer device. The scan code is interpreted by the interpreting program based on the identification code so as to generate a key code complying with the desired keyboard input mode.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
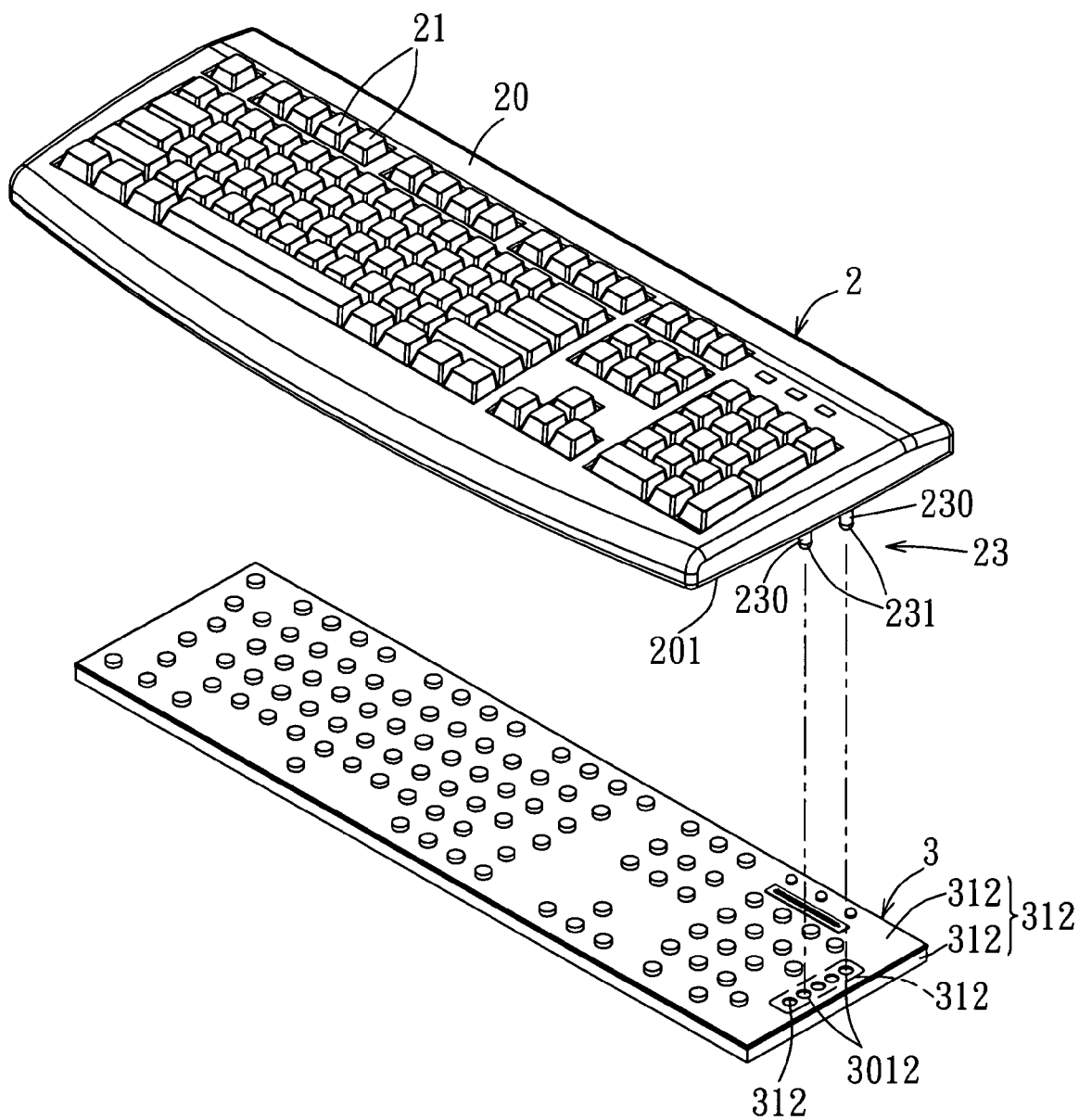
FIG. 1 is a partly exploded perspective view showing the first preferred embodiment of a computer keyboard assembly according to the present invention.

Before the present invention is described in greater detail, it should be noted that like elements are denoted by the same reference numerals throughout the disclosure.

Figure 2:
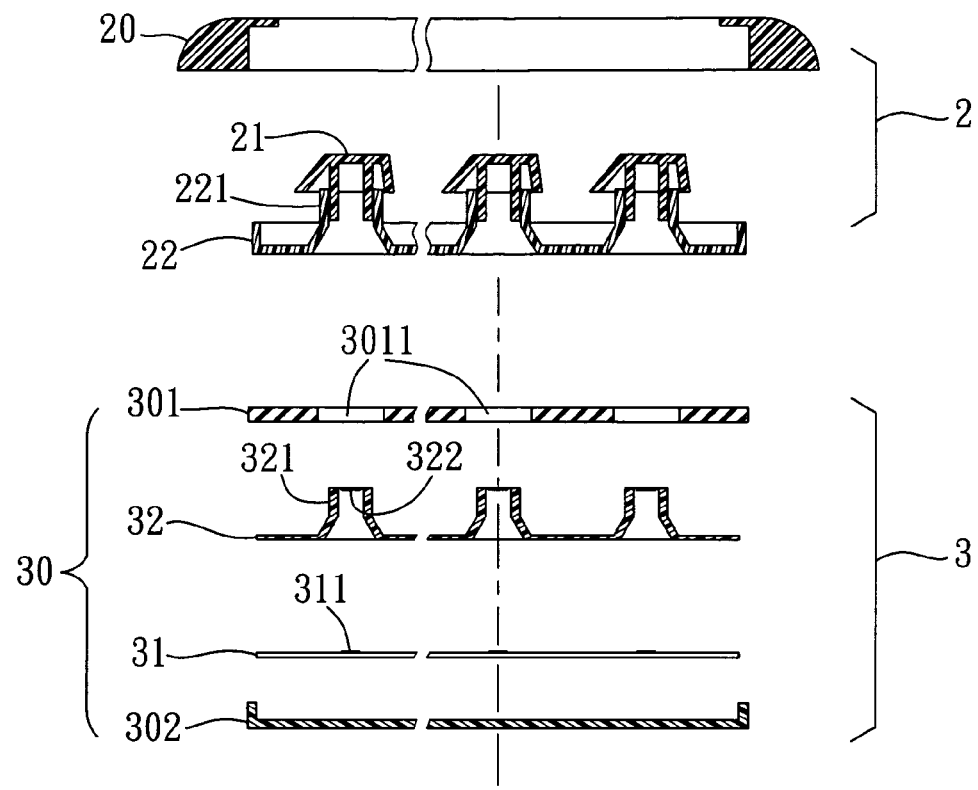
FIG. 2 is an exploded, fragmentary sectional schematic view showing top and bottom modules of the first preferred embodiment.
Figure 3:
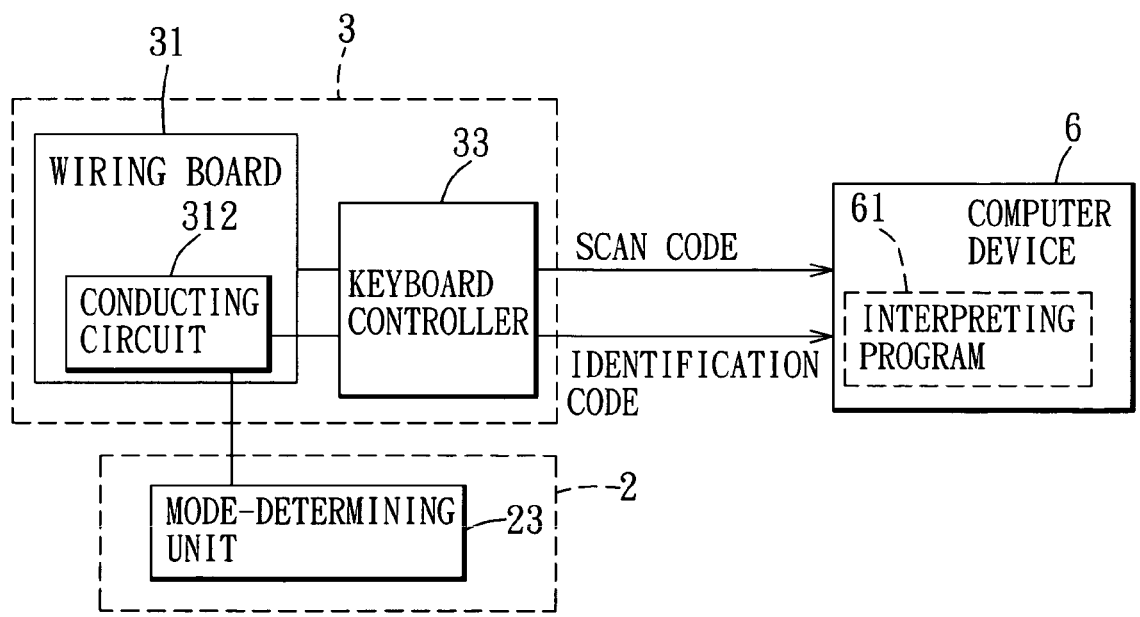
FIG. 3 is a schematic circuit block diagram illustrating the first preferred embodiment.

Referring to FIGS. 1 to 3, the first preferred embodiment of a computer keyboard assembly according to the present invention is shown to include a top module 2 and a bottom module 3. The computer keyboard assembly is adapted to be coupled to a computer device 6, such as a desktop computer or a notebook computer, installed with an interpreting program 61.

The top module 2 includes a frame body 20, a plurality of key caps 21, and a mode-determining unit 23.

In this embodiment, the frame body 20 has a key-mounting frame portion 22 mounted therein and formed with a plurality of positioning seats 221, as shown in FIG. 2.

The key caps 21 are mounted movably and respectively on the positioning seats 221 of the key-mounting frame portion 22 of the frame body 20, as shown in FIG. 2, such that each of the key caps 21 is operable so as to move between a normal position and a depressed position.

The mode-determining unit 23 provides a mode identification signal corresponding to a desired keyboard input mode. In this embodiment, the mode-determining unit 23 includes a set of pins 230 extending downwardly from a bottom side 201 of the frame body 20, and a set of electrical contacts 231, each of which is mounted on a bottom end of a corresponding one of the pins 230, as shown in FIG. 1.

The bottom module 3 includes a hollow housing 30, a wiring board 31, an actuating unit 32, and a keyboard controller 33.

The housing 30 is disposed under and is connected separably to the frame body 20 of the top module 2. In this embodiment, the housing 30 has a top wall 301 formed with a plurality of through holes 3011, each of which is registered with a corresponding one of the key caps 21 of the top module 2, and a lower casing 302 cooperating with the top wall 301 to define a receiving space, as shown in FIG. 2. Moreover, the top wall 301 of the housing 30 is further formed with a plurality of pin holes 3012. Each of the electrical contacts 231 on the pins 230 is registered with a corresponding one of the pin holes 3012, as shown in FIG. 1.

The wiring board 31 is mounted in the receiving space in the housing 30, and is provided with a plurality of electrical contacts 311 thereon, each of which is registered with a corresponding one of the through holes 3011 in the top wall 301 of the housing 30, as shown in FIG. 2. In this embodiment, as shown in FIG. 1, the wiring board 31 has a conducting circuit 312 provided with a plurality of conducting contacts 3121, each of which is registered with a corresponding one of the pin holes 3012 in the top wall 301. It is noted that each of the electrical contacts 231 on the pins 230 is configured to connect electrically with a predetermined one of the conducting contacts 3121 so as to generate the mode identification signal. As such, the pins 230 of the top module 2 are inserted respectively through the corresponding ones of the pin holes 3012 such that the electrical contacts 231 on the pins 230 contact electrically and respectively the predetermined ones of the conducting contacts 3121.

The actuating unit 32 is disposed on the wiring board 31, and has a plurality of upright biasing members 321, each of which extends upwardly through a corresponding one of the through holes 3011 in the top wall of the housing 30, has an actuator 322 registered with a corresponding one of the electrical contacts 311 on the wiring board 31, and contacts electrically the corresponding one of the electrical contacts 311 as a result of movement of the corresponding one of the key caps 21 from the normal position to the depressed position such that the wiring board 31 generates a key signal.

As shown in FIG. 3, the keyboard controller 33 is connected electrically to the wiring board 31 and the mode-determining unit 23 via the conducting circuit 312, and receives and interprets the key signal from the wiring board 31 and the mode identification signal from the mode-determining unit 23 of the top module 2 so as to output a scan code corresponding to the key signal, and an identification code corresponding to the mode identification signal to the computer device 6. The scan code is interpreted by the interpreting program 61 based on the identification code so as to generate a key code complying with the desired keyboard input mode.

Figure 5:
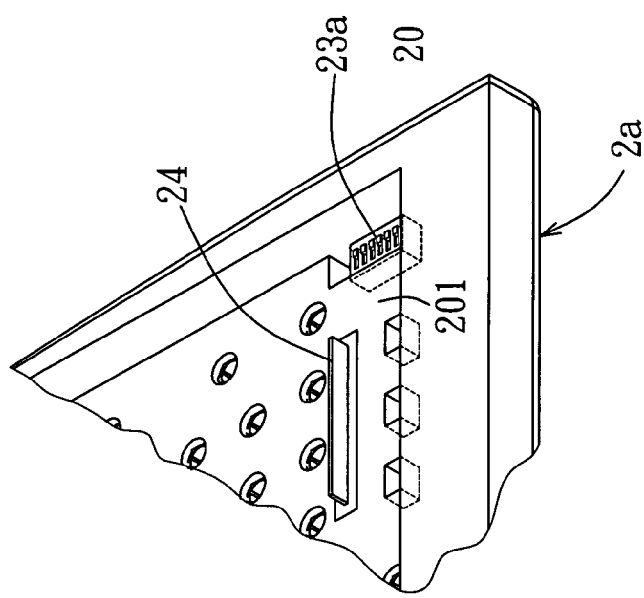
FIG. 5 is a fragmentary perspective view of a top module of the second preferred embodiment.
Figure 4:
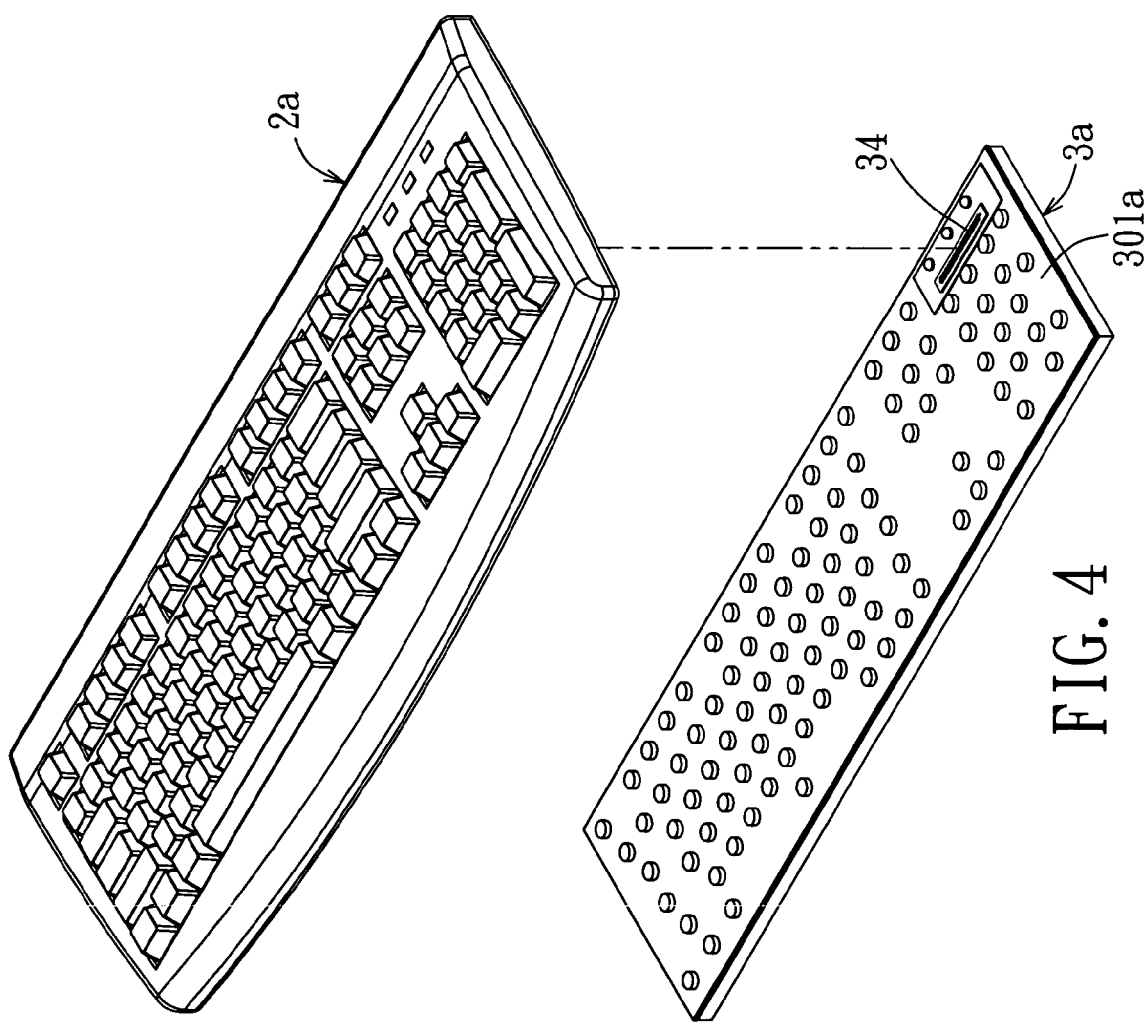
FIG. 4 is a partly exploded perspective view showing the second preferred embodiment of a computer keyboard assembly according to the present invention.
Figure 6:
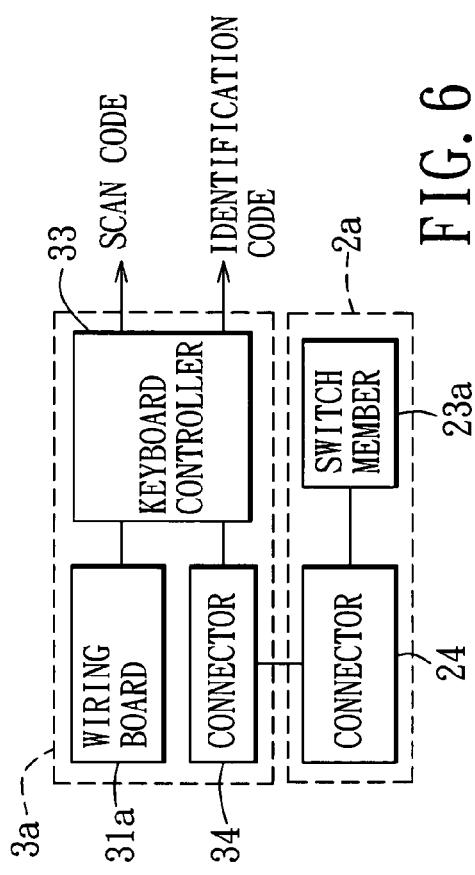
FIG. 6 is a schematic circuit block diagram illustrating the second preferred embodiment.

FIGS. 4 to 6 illustrate the second preferred embodiment of a computer keyboard assembly according to this invention, which is a modification of the first preferred embodiment. In this embodiment, the mode-determining unit of the top module (2a) includes a switch member (23a) operable so as to generate the mode identification signal corresponding to the desired keyboard input mode. In this embodiment, the switch member (23a) is a multi-bit switch, such as an 8-bit DIP switch, mounted on the bottom side 201 of the frame body 20, as shown in FIG. 5.

The top module (2a) further has a connector 24, such as a plug, mounted on the bottom side 201 of the frame body 20 and connected electrically to the switch member (23a) of the mode-determining unit.

The bottom module (3a) further has a connector 34, such as a socket, disposed on the top wall (301a) (see FIG. 4) and connected electrically to the keyboard controller 33 and the connector 24 such that the mode identification signal from the multi-bit switch (23a) is transmitted to the keyboard controller 33 via the connectors 24, 34, as shown in FIG. 5.

Figure 8:
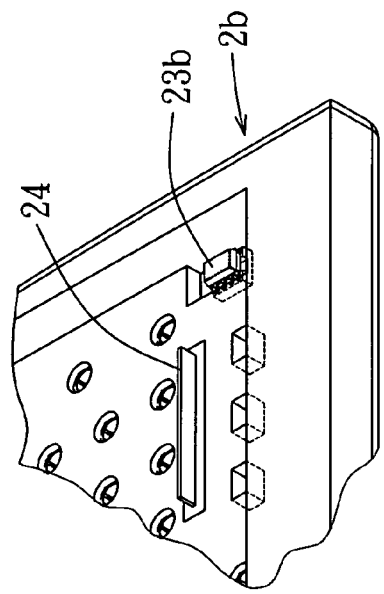
FIG. 8 is a fragmentary perspective view of a top module of the third preferred embodiment.
Figure 7:
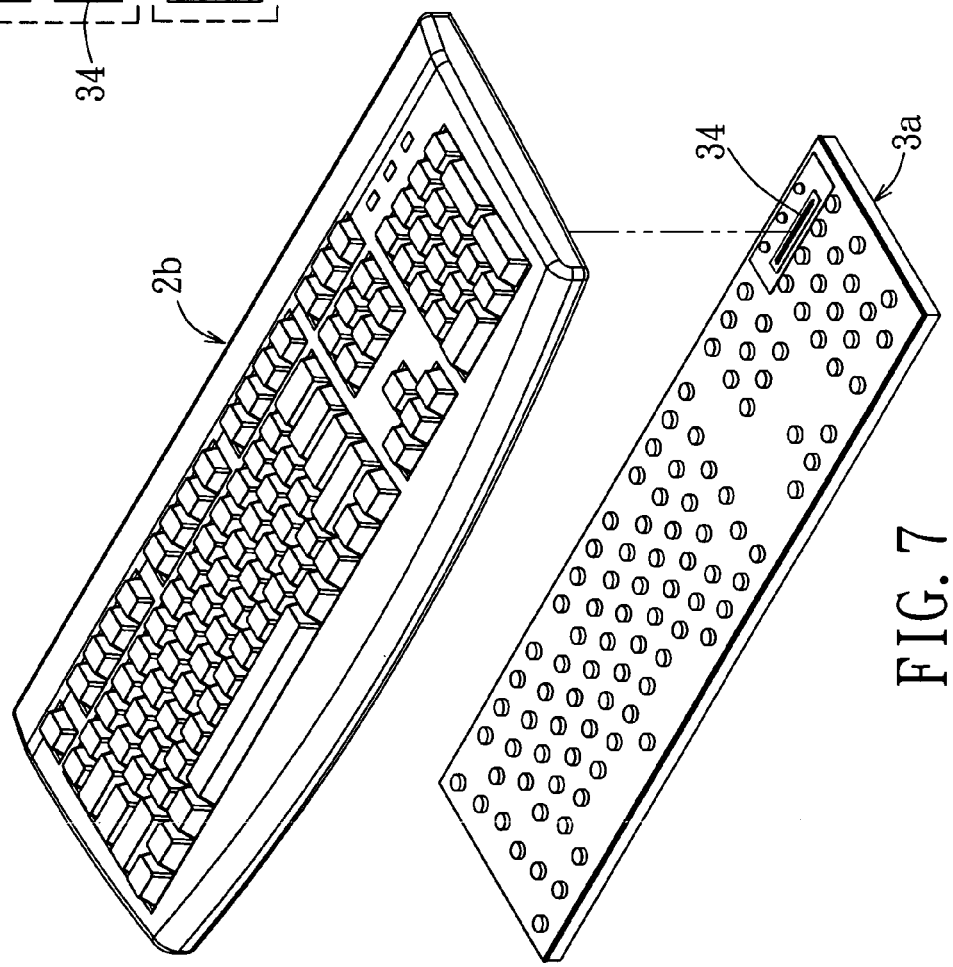
FIG. 7 is a partly exploded perspective view showing the third preferred embodiment of a computer keyboard assembly according to the present invention.

FIGS. 7 and 8 illustrate the third preferred embodiment of a computer keyboard assembly according to this invention, which is a modification of the second preferred embodiment. Unlike the previous embodiments, the mode-determining unit of the top module (2b) includes an integrated circuit (23b) connected electrically to the connector 24 and preset with the mode identification signal therein. Similar to the second preferred embodiment, the mode identification signal from the integrated circuit (23b) is transmitted to the keyboard controller (not shown) via the connectors 24, 34 connected electrically to each other.

Figure 9:
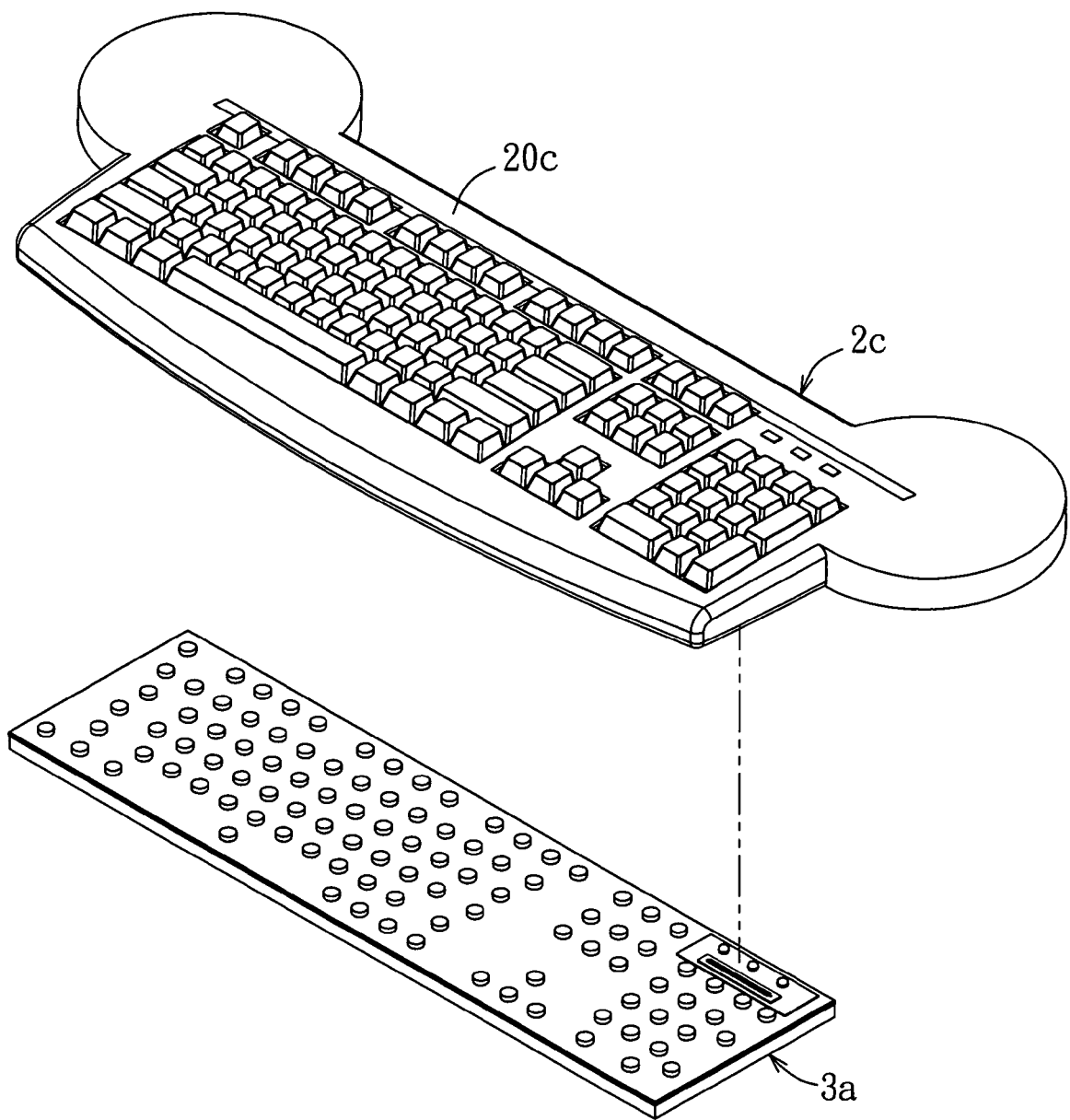
FIG. 9 is a partly exploded perspective view showing the fourth preferred embodiment of a computer keyboard assembly according to the present invention.

FIG. 9 illustrates the fourth preferred embodiment of a computer keyboard assembly according to this invention, which is a modification of the third preferred embodiment. In this embodiment, the frame body (20c) of the top module (2c) has an attractive appearance for children.

Figure 10:
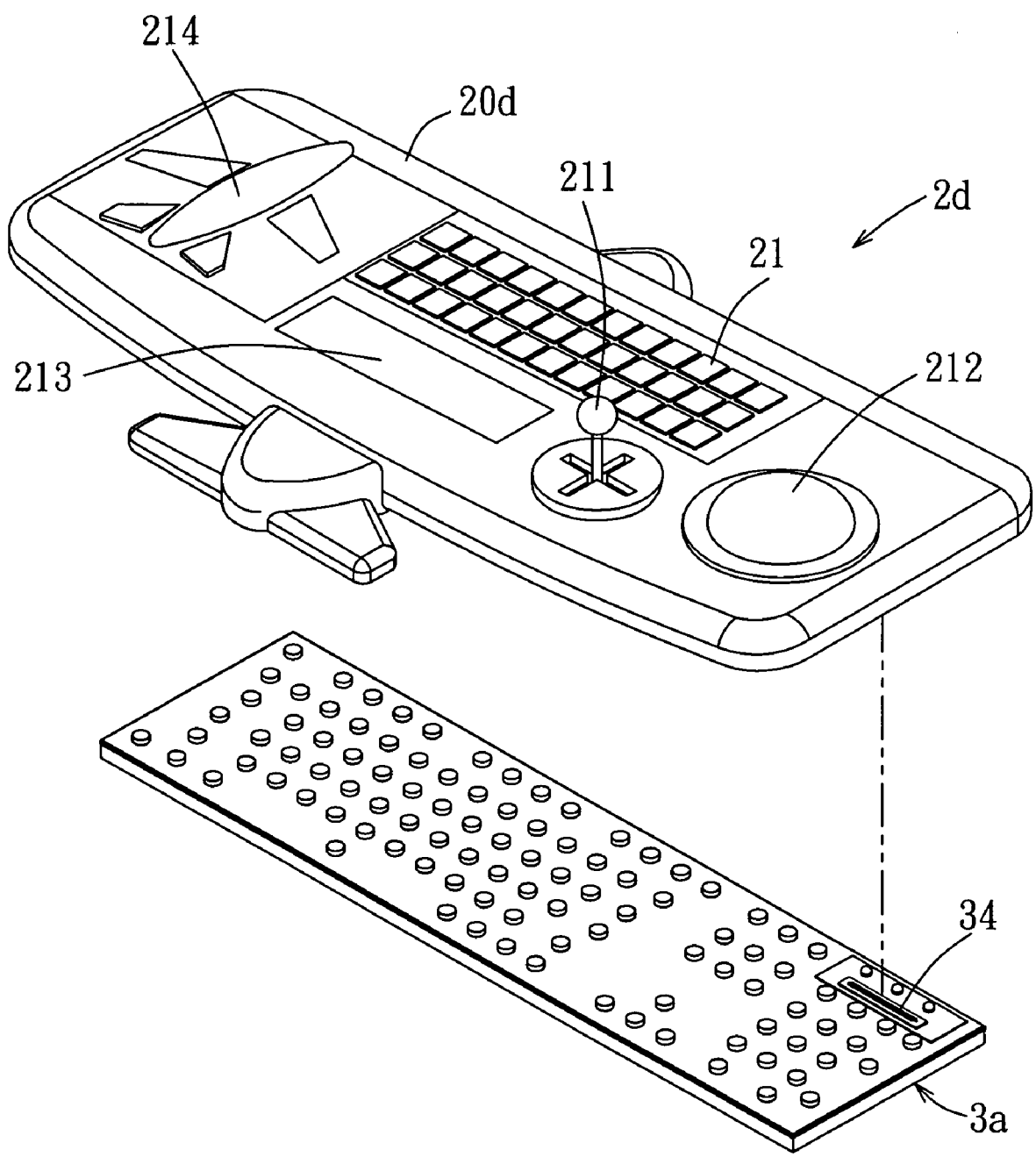
FIG. 10 is a partly exploded perspective view showing the fifth preferred embodiment of a computer keyboard assembly according to the present invention.

FIG. 10 illustrates the fifth preferred embodiment of a computer keyboard assembly according to this invention, which is a modification of the third preferred embodiment. In this embodiment, the top module (2d) further includes an operating member mounted separately on the frame body (20d) for contact with corresponding ones of the electrical contacts (not shown) on the wiring board (not shown). The operating member includes a joystick device 211, a rolling wheel device 212, a touch pad device 213, and a game control device 214 with an airplane model. When the computer keyboard assembly is operated in a game input mode as the desired keyboard input mode by using the game control device 214, a control code corresponding to manual operation of the airplane model of the game control device 214 can be outputted to the computer device by a flight simulation game software installed in the computer device (not shown). For example, when the computer keyboard assembly outputs a control code corresponding to manual operation of depressing a right fin of airplane model to the computer device, the computer device executes rightward flying of an airplane in the flight simulation game based on the flight simulation game software.

The following are some of the advantages attributed to the computer keyboard assembly of the present invention:

1. Since the top module 2, (2a, 2b, 2c, 2d) can be separated from the bottom module 3, (3a), mechanical malfunctions resulting from dust or stain can be obviated by simply cleaning the computer keyboard assembly. Furthermore, if the top module 2, (2a, 2b, 2c, 2d) is damaged, repair can be achieved by replacing the damaged top module 2, (2a, 2b, 2c, 2d) instead of the whole computer keyboard assembly, which is easier and cheaper.

2. In actual use, since the keyboard controller 33 generates the identification code based on the mode identification signal from the top module (2a, 2b, 2c), the same bottom module (3a) can match various top modules (2a, 2b, 2c). Therefore, production of the computer keyboard assembly of the present invention can be simplified.

3. Since various operating devices, such as the joystick device 211, the rolling wheel device 212, the touch pad device 213, and the game control device 214, can be mounted on the top module (2d), the computer keyboard assembly of the present invention facilitates different input operations.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A computer keyboard assembly adapted to be coupled to a computer device installed with an interpreting program, comprising:

a top module including
a frame body,
a plurality of key caps mounted movably on said frame body such that each of said key caps is operable so as to move between a normal position and a depressed position, and
a mode-determining unit for providing a mode identification signal corresponding to a desired keyboard input mode; and a bottom module including
a hollow housing disposed under and connected separably to said frame body of said top module, and having a top wall formed with a plurality of through holes, each of which is registered with a corresponding one of said key caps of said top module,
a wiring board mounted in said housing and provided with a plurality of electrical contacts thereon, each of which is registered with a corresponding one of said through holes in said top wall of said housing,
an actuating unit disposed on said wiring board and having a plurality of upright biasing members, each of which extends upwardly through a corresponding one of said through holes in said top wall of said housing, has an actuator registered with a corresponding one of said electrical contacts on said wiring board, and contacts electrically the corresponding one of said electrical contacts as a result of movement of the corresponding one of said key caps from the normal position to the depressed position such that said wiring board generates a key signal, and
a keyboard controller connected electrically to said wiring board and said mode-determining unit, and receiving and interpreting the key signal from said wiring board and the mode identification signal from said mode-determining unit so as to output a scan code corresponding to the key signal, and an identification code corresponding to the mode identification signal to the computer device, whereby the scan code is interpreted by the interpreting program based on the identification code so as to generate a key code complying with the desired keyboard input mode.

2. The computer keyboard assembly as claimed in claim 1, wherein said mode-determining unit includes a set of electrical contacts, said wiring board having a conducting circuit provided with a plurality of conducting contacts, each of said electrical contacts being configured to connect electrically with a predetermined one of said conducting contacts so as to generate the mode identification signal.

3. The computer keyboard assembly as claimed in claim 2, wherein said mode-determining unit further includes a set of pins extending downwardly from a bottom side of said frame body, each of said electrical contacts being mounted on a bottom end of a corresponding one of said pins, said top wall of said housing being further formed with a plurality of pin holes, each of which is registered with a corresponding one of said conducting contacts of said conducting circuit, each of said electrical contacts on said pins being registered with a corresponding one of said pin holes in said top wall, said pins of said top module being inserted respectively through the corresponding ones of said pin holes in said top wall such that said electrical contacts on said pins contact electrically and respectively the predetermined ones of said conducting contacts.

4. The computer keyboard assembly as claimed in claim 1, wherein said mode-determining unit includes a switch member operable so as to generate the mode identification signal corresponding to the desired keyboard input mode.

5. The computer keyboard assembly as claimed in claim 4, wherein said switch member includes a multi-bit switch.

6. The computer keyboard assembly as claimed in claim 1, wherein said mode-determining unit includes an integrated circuit preset with the mode identification signal therein.

7. The computer keyboard assembly as claimed in claim 1, wherein said top module further includes an operating member mounted separately on said frame body for contact with corresponding ones of said electrical contacts on said wiring board.

8. The computer keyboard assembly as claimed in claim 7, wherein said operating member is selected from the group that includes a joystick device, a rolling wheel device, a touch pad device and a game control device.

* * * * *